(12) United States Patent
Wang

(10) Patent No.: US 9,258,180 B2
(45) Date of Patent: Feb. 9, 2016

(54) INFORMATION PROCESSING APPARATUS AND COMPUTER-READABLE STORAGE MEDIUM

(71) Applicant: Weibo Wang, Kanagawa (JP)

(72) Inventor: Weibo Wang, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 265 days.

(21) Appl. No.: 13/751,360

(22) Filed: Jan. 28, 2013

(65) Prior Publication Data

US 2013/0198329 A1    Aug. 1, 2013

(30) Foreign Application Priority Data

Jan. 30, 2012  (JP) ................................. 2012-016976
Dec. 7, 2012   (JP) ................................. 2012-268771

(51) Int. Cl.
*G06F 15/167*  (2006.01)
*H04L 12/24*   (2006.01)
*H04L 29/06*   (2006.01)

(52) U.S. Cl.
CPC ............ *H04L 41/00* (2013.01); *H04L 41/0226* (2013.01); *H04L 63/00* (2013.01); *H04L 65/00* (2013.01)

(58) Field of Classification Search
CPC ............................... H04L 65/00; H04L 63/00
USPC ................................................. 709/216, 217
See application file for complete search history.

(56) References Cited

U.S. PATENT DOCUMENTS

| 5,740,368 | A   | 4/1998 | Villalpando |
| 7,987,295 | B2* | 7/2011 | Tanaka ........................ 709/250 |
| 2006/0215216 | A1 | 9/2006 | Oshima |
| 2012/0004739 | A1* | 1/2012 | Sato et al. ........................ 700/7 |

FOREIGN PATENT DOCUMENTS

| JP | 11-296444   | 10/1999 |
| JP | 2005-085219 | 3/2005  |
| JP | 2006-270193 | 10/2006 |
| JP | 3937478     | 4/2007  |
| JP | 2009-253657 | 10/2009 |

* cited by examiner

*Primary Examiner* — Adnan Mirza
(74) *Attorney, Agent, or Firm* — Oblon, McClelland, Maier & Neustadt, L.L.P.

(57) ABSTRACT

An information processing apparatus is communicable with a device via a first communication channel and communicable with a device management apparatus for managing the device via a second communication channel. The information processing apparatus includes a request generator configured to generate a first device information acquisition request in a second protocol based on a device information acquisition request in a first protocol transmitted from the device management apparatus via the second communication channel; a first transmitter configured to transmit the first device information acquisition request to the device via the first communication channel; a first receiver configured to receive a first device information acquisition response in the second protocol including device information from the device via the first communication channel; and a response generator configured to generate a device information acquisition response in the first protocol based on the first device information acquisition response.

11 Claims, 11 Drawing Sheets

FIG.3

```xml
<?xml version="1.0" encoding="utf-8" standalone="no" ?>
- <device id="USB001" name="MFP201" vender="ABC">
  - <info monitorstartdate="1322185838">
    - <pagecount updated="TRUE">
        <value name="PAGECOUNT">2207</value>
      </pagecount>
    - <statuses>
      - <status active="TRUE" number="1">
          <code>10007</code>
          <display>aaa</display>
          <online>TRUE</online>
        </status>
      - <status active="FALSE" number="2">
          <code>30912</code>
          <display />
          <online>TRUE</online>
        </status>
      - <status active="TRUE" number="6">
          <code>30608</code>
          <display />
          <online>TRUE</online>
        </status>
      </statuses>
    - <configs>
        <config name="COLOR">COLOR</config>
        <config name="DISPLAY CHARACTER SIZE">0</config>
        <config name="DISPLAY LINES">0</config>
        <config name="MEMORY">1610612736</config>
        <config name="SERIAL NUMBER">abc 000000</config>
      - <config enumerated="1" name="DISK">
          <value>DISK</value>
        </config>
      - <config enumerated="1" name="DISKSTORAGE">
          <value>DISKSTORAGE</value>
        </config>
      </configs>
    - <variables>
        <variable name="INTRAY1MEDIA">GLOSSY</variable>
        <variable name="INTRAY1QUANT">FULL</variable>
        <variable name="INTRAY1SIZE">A4LONG</variable>
        <variable name="INTRAY2MEDIA">RECYCLED</variable>
        <variable name="INTRAY2QUANT">FULL</variable>
        <variable name="INTRAY2SIZE">A4LONG</variable>
        <variable name="INTRAY3MEDIA">PLAIN</variable>
        <variable name="INTRAY3QUANT">1/5</variable>
        <variable name="INTRAY3SIZE">A3</variable>
        <variable name="INTRAY4MEDIA">RECYCLED</variable>
        <variable name="INTRAY4QUANT">1/5</variable>
        <variable name="INTRAY4SIZE">A4LONG</variable>
      </variables>
    - <memory>
        <value name="LARGEST">1610612736</value>
        <value name="TOTAL">0</value>
      </memory>
    </info>
  </device>
```

FIG.4A

```xml
<?xml version="1.0" encoding="utf-8" standalone="no" ?>
- <device id="USB003" name="XYZ 001" vender="PPP">
  - <info monitorstartdate="1317721755">
    - <pagecount updated="TRUE">
        <value name="COLORPAGECOUNT">0</value>
        <value name="DUPLEX">9</value>
        <value name="DUPLEXJAMCOUNT">0</value>
        <value name="INNERJAMCOUNT">0</value>
        <value name="MISFEEDJAMBPCOUNT">0</value>
        <value name="MISFEEDJAMTRAY1COUNT">2</value>
        <value name="MISFEEDJAMTRAY2COUNT">0</value>
        <value name="MONOPAGECOUNT">138</value>
        <value name="OUTERJAMCOUNT">2</value>
        <value name="PAGECOUNT">138</value>
      </pagecount>
    - <statuses>
      - <status active="TRUE" number="1">
          <code>10003</code>
          <display>bb</display>
          <online>FALSE</online>
          <value name="ENGINETYPE">PROP1A</value>
          <value name="INTRAY1SIZE">LETTER</value>
          <value name="INTRAY2SIZE">A4</value>
          <value name="INTRAYMMEDIA">PLAIN</value>
          <value name="INTRAYMSIZE">A4</value>
          <value name="MEDIATYPETRAY1">PLAIN</value>
          <value name="MEDIATYPETRAY2">PLAIN</value>
          <value name="TONER">0004</value>
          <value name="TOTAL MEMORY">131072Byte</value>
          <value name="TRAY2">INSTALL</value>
          <value name="Tray1">NotEmpty</value>
          <value name="Tray2">NotEmpty</value>
          <value name="TrayM">Empty</value>
          <value name="WARNING">NO WARNING</value>
        </status>
      </statuses>
    - <configs>
      - <config name="IN TRAY">
          <value>TRAY1</value>
          <value>TRAY2</value>
          <value>TRAY4</value>
        </config>
```

FIG.4B

```xml
- <config name="PAPERS">
    <value>A4</value>
    <value>B5</value>
    <value>A5</value>
    <value>A6</value>
    <value>LEGAL</value>
    <value>LETTER</value>
    <value>EXECUTIVE</value>
    <value>FGL</value>
    <value>FOOLSCAP</value>
    <value>FOLIO</value>
    <value>K16</value>
    <value>POSTCARDS</value>
    <value>REPLYPAIDCARD</value>
    <value>CUSTOM</value>
    <value>B6</value>
    <value>HALFLETTER</value>
    <value>COM10</value>
    <value>MONARCH</value>
    <value>C5</value>
    <value>C6</value>
    <value>DL</value>
  </config>
  </configs>
- <variables>
    <variable name="LANG">ENGLISH</variable>
  </variables>
- <defaultvariables>
    <variable name="MACHINECOMMENT" />
    <variable name="SERIALNO">12345678</variable>
  </defaultvariables>
- <memory>
    <value name="LARGEST">0</value>
    <value name="TOTAL">134217728</value>
  </memory>
- <pinfo>
    <value name="PVERSION">V1.09</value>
    <value name="PXLVERSION">V1.06</value>
    <value name="POSTSCRIPTVERSION">V1.04</value>
    <value name="SYSTEMVERSION">V1.06</value>
  </pinfo>
  </info>
</device>
```

FIG.12

```xml
<?xml version="1.0" encoding="utf-8" standalone="no" ?>
<device id="USB001" name="PJ101" vender="RABC">
  <info monitorstartdate="132183456">
    <count updated="TRUE">
      <value name="TOTALHOURS">2207</value>
    </count>
    <statuses>
      <status active="TRUE" number="1">
        <code>10007</code>
        <display>aaa</display>
        <poweron>TRUE</poweron>
      </status>
      <status active="FALSE" number="2">
        <code>88999</code>
        <display>LAMPDEAD</display>
        <poweron>ERR3</poweron>
      </status>
      <status active="TRUE" number="1">
        <code>10015</code>
        <display>bbb</display>
        <poweron>STANDBY</poweron>
      </status>
      <status active="FALSE" number="2">
        <code>20112</code>
        <display>ccc</display>
        <poweron>FALSE</poweron>
      </status>
    </statuses>
    <configs>
      <config name="LAMPS">5</config>
      <config name="INPUT">3</config>
      <config name="AVMT">4</config>
      <config name="INST">1</config>
      <config name="INFO">3</config>
      <config name="SERIAL NUMBER">ppj000111</config>
    </configs>
    <variables>
      <variable name="PJNAME">GLAXY</variable>
      <variable name="PJMK">RIRICO</variable>
      <variable name="TYPE">SUPERALL</variable>
      <variable name="LENS">AF28</variable>
      <variable name="INPUT">HDMI</variable>
      <variable name="FOCUS">AUTO</variable>
    </variables>
    <memory>
      <value name="LARGEST">1024</value>
      <value name="TOTAL">128</value>
    </memory>
  </info>
</device>
```

FIG.13

```xml
<?xml version="1.0" encoding="utf-8" standalone="no" ?>
<device id="USB003" name="XYZ 001" vender="PPP">
  <info monitorstartdate="131777878">
    <pagecount updated="TRUE">
      <value name="LAMPS">3</value>
      <value name="INPUT">3</value>
      <value name="AVMT">1</value>
      <value name="INST">2</value>
      <value name="INFO">4</value>
      <value name="TOTALHOURS">3456</value>
    </pagecount>
    <statuses>
      <status active="TRUE" number="1">
        <code>10006</code>
        <display>abc</display>
        <poweron>TRUE</poweron>
        <value name="PJNAME">GLAXY</value>
        <value name="PJMK">RIRICO</value>
        <value name="TYPE">SUPERALL</value>
        <value name="LENS">AF28</value>
        <value name="INPUT">HDMI</value>
        <value name="FOCUS">AUTO</value>
      </status>
    </statuses>
    <configs>
      <config name="LAMPS">
        <value>LED1</value>
        <value>NORMAL2</value>
        <value>LASER4</value>
      </config>
      <config name="INTERFACE">
        <value>HDMI</value>
        <value>USB</value>
        <value>LAN</value>
      </config>
      <config name="INPUT">
        <value>VOICE</value>
        <value>VIDEO</value>
        <value>COMPUTER</value>
      </config>
    </configs>
    <variables>
      <variable name="LOCATION">2FA</variable>
    </variables>
    <defaultvariables>
      <variable name="MACHINECOMMENT">MARKETING GROUP</variable>
      <variable name="SERIALNO">AA12345678</variable>
    </defaultvariables>
    <memory>
      <value name="LARGEST">10240</value>
      <value name="TOTAL">512000</value>
    </memory>
  </info>
</device>
```

INFORMATION PROCESSING APPARATUS AND COMPUTER-READABLE STORAGE MEDIUM

CROSS-REFERENCE TO RELATED APPLICATIONS

The present application claims priority to and incorporates by reference the entire contents of Japanese Patent Application No. 2012-016976 filed in Japan on Jan. 30, 2012 and Japanese Patent Application No. 2012-268771 filed in Japan on Dec. 7, 2012.

BACKGROUND OF THE INVENTION

1. Field of the Invention

The present invention relates to an information processing apparatus and a computer-readable storage medium.

2. Description of the Related Art

Conventionally, device management apparatuses that manage devices connected over a network are known. For example, Japanese patent No. 3937478 discloses a technology enabling a processing module and a device to be managed to exchange management information using protocols by connecting the device to be managed to a network using a network expansion board having an agent for each of various protocols.

Also, some of these device management apparatuses manage, via an information processing apparatus such as a personal computer (PC) connected over a network, devices connected to the information processing apparatus via a communication interface such as a universal serial bus (USB) cable.

However, with the conventional technology described above, there is an issue that, in the case a device management apparatus manages a device via an information processing apparatus, information that can be acquired is limited compared to when directly managing a device and the extent of management is limited.

Therefore, there is a need for an information processing apparatus and a computer-readable storage medium that allow a device management apparatus to perform high-level management even when a device is to be managed via an information processing apparatus.

SUMMARY OF THE INVENTION

It is an object of the present invention to at least partially solve the problems in the conventional technology.

According to an embodiment, there is provided an information processing apparatus communicable with a device via a first communication channel and communicable with a device management apparatus for managing the device via a second communication channel. The information processing apparatus includes a request generator configured to generate a first device information acquisition request in a second protocol based on a device information acquisition request in a first protocol transmitted from the device management apparatus via the second communication channel; a first transmitter configured to transmit the first device information acquisition request in the second protocol to the device via the first communication channel; a first receiver configured to receive a first device information acquisition response in the second protocol including device information of the device from the device via the first communication channel; and a response generator configured to generate a device information acquisition response in the first protocol based on the first device information acquisition response in the second protocol.

According to another embodiment, there is provided a non-transitory computer-readable storage medium with an executable program stored thereon. The program instructs a computer that is communicable with a device via a first communication channel and communicable with a device management apparatus for managing the device via a second communication channel, to perform: generating a first device information acquisition request in a second protocol based on a device information acquisition request in a first protocol transmitted from the device management apparatus via the second communication channel; transmitting the first device information acquisition request in the second protocol to the device via the first communication channel; receiving a first device information acquisition response in the second protocol including device information of the device from the device via the first communication channel; and generating a device information acquisition response in the first protocol based on the first device information acquisition response in the second protocol.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 illustrates an example of a PJL response according to the present embodiment;

FIGS. 4A and 4B illustrate an example of a PJL response according to the present embodiment;

FIGS. 12 and 13 illustrate an example of a PJL response according to the modification.

DETAILED DESCRIPTION OF THE PREFERRED EMBODIMENTS

Hereinafter, embodiments according to the present invention will be described in detail with reference to the accompanying drawings.

First, a configuration of a device management system including an information processing apparatus of an embodiment will be described.

Figure 1:
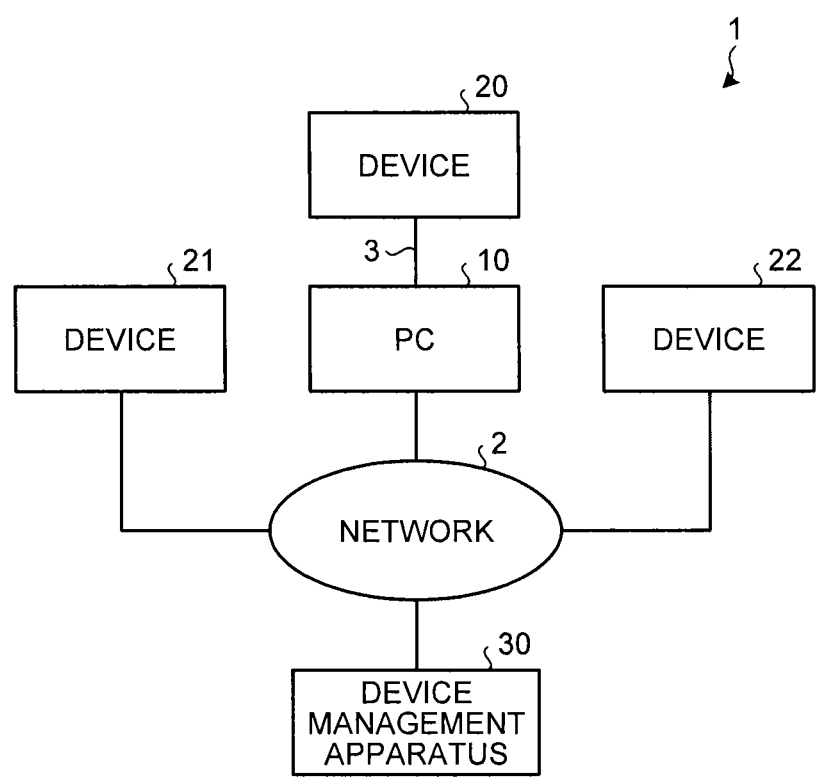
FIG. 1 is a block diagram illustrating an example of a configuration of a device management system according to a present embodiment.

FIG. 1 is a block diagram illustrating an example of a configuration of a device management system 1 of the present embodiment. As illustrated in FIG. 1, the device management system 1 includes a personal computer (PC) 10 (an example of an information processing apparatus), devices 20 to 22, and a device management apparatus 30.

The PC 10, the devices 21 and 22, and the device management apparatus 30 are connected over a network 2 (an example of a second communication channel). The PC 10 and the device 20 are connected via a communication interface 3 (an example of a first communication channel). The network 2 can be realized by the Internet, a local area network (LAN) or the like, for example. The communication interface 3 may be realized by a universal serial bus (USB) cable or the like, for example.

The device management apparatus 30 is installed at a service center of a service provider company that provides a device management service, and the PC 10 and the devices 20 to 22 are installed at service locations. A service location is an area where a device to be managed is installed, and an office of a company that receives the device management service or the like corresponds to the service location, for example. Additionally, the installation location of the device management apparatus 30 is not limited to a service center, and it may also be a service location or the like.

The device management apparatus 30 is for managing the PC 10 and the devices 20 to 22, and it may be realized by a PC or the like in which a device management (manager) program described later is installed. In FIG. 1, the PC 10 and the devices 20 to 22 are illustrated as the devices to be managed by the device management apparatus 30, but the devices to be managed by the device management apparatus 30 are not limited to these.

An agent program described later is installed in the PC 10, and when acquisition of device information is requested by the device management apparatus 30, the PC 10 acquires the device information from the device 20 via the communication interface 3 and notifies the device management apparatus 30 of the same. The device management apparatus 30 is thereby enabled to manage the device 20 that is not connected to the network 2.

It is enough if the device 20 is a device that is capable of connecting at least to the communication interface 3, and if the devices 21 and 22 are devices that are capable of connecting at least to the network 2. Additionally, the devices 20 to 22 may be devices that are capable of connecting to both the communication interface 3 and the network 2. For examples, the devices 20 to 22 may be image forming devices such as printers, copy machines, multifunction peripherals, scanners and facsimiles, or various electronic devices such as projectors, cameras, air conditioners, refrigerators, fluorescent lights, vending machines and handheld terminals. The multifunction peripheral (MFP) serves the function of at least two of the copy function, the print function, the scan function and the facsimile function. Additionally, in the present embodiment, an explanation will be given assuming that the devices 20 to 22 are printers.

Moreover, in the following explanation, a device that is connected to the network 2 may be referred to as a network device, and a device that is connected to the communication interface 3 may be referred to as a local device.

Figure 2:
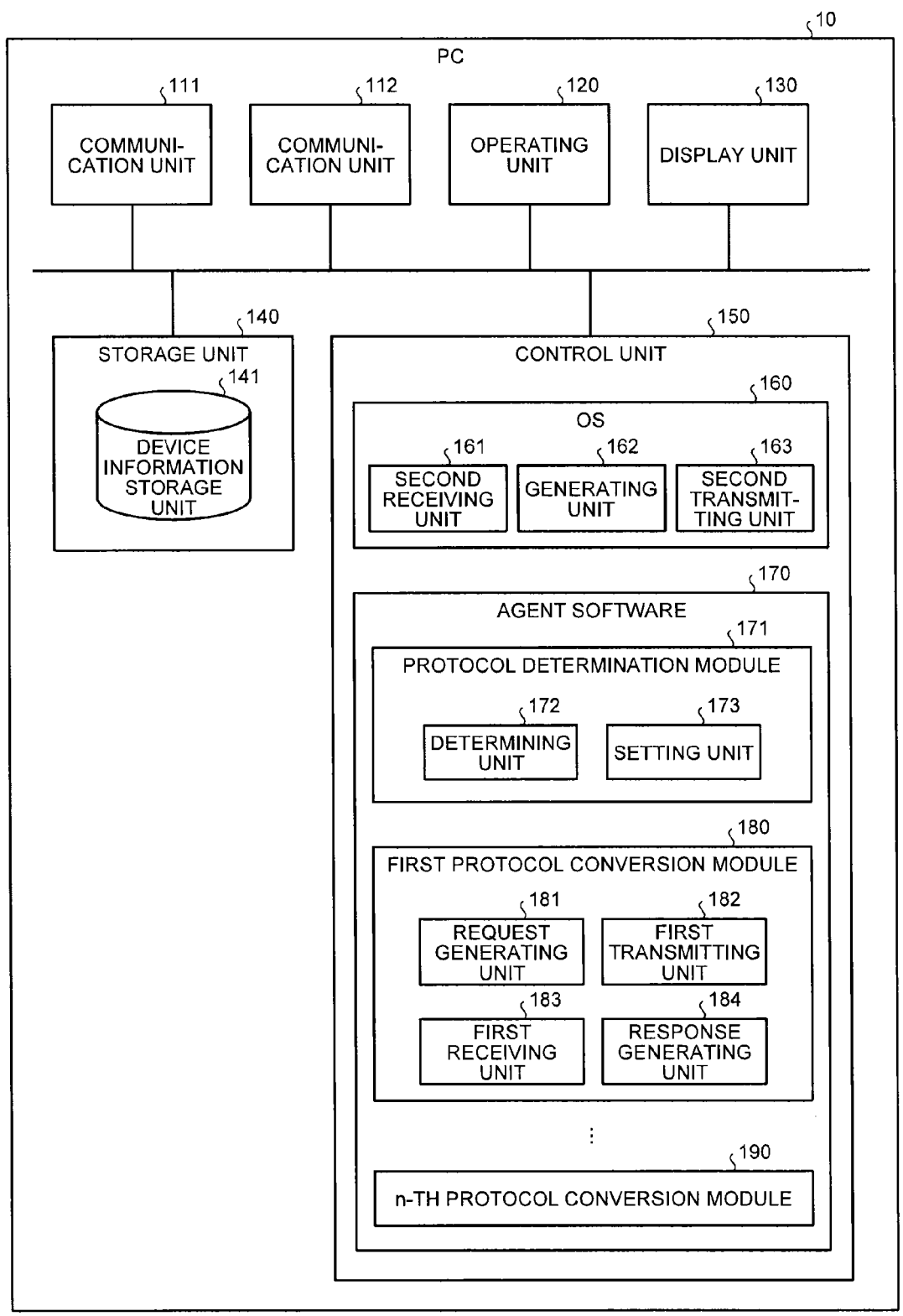
FIG. 2 is a block diagram illustrating an example of a configuration of a PC 10 according to the present embodiment.

FIG. 2 is a block diagram illustrating an example of a configuration of the PC 10 according to the present embodiment. As illustrated in FIG. 2, the PC 10 includes a communication unit 111, a communication unit 112, an operating unit 120, a display unit 130, a storage unit 140 and a control unit 150.

The communication unit 111 is for communicating with an external device such as the device management apparatus 30 over the network 2, and it may be realized by a network interface card (NIC) or the like.

The communication unit 112 is for communicating with a local device such as the device 20 or the like via the communication interface 3, and it may be realized by a USB or the like.

The operating unit 120 is for inputting various operations, and it may be realized by an input device such as a keyboard, a mouse, a touch pad, a touch panel or the like.

The display unit 130 is for displaying various screens, and it may be realized by a display device such as a liquid-crystal display, a touch panel display or the like.

The storage unit 140 stores various programs such as operating system (OS) programs and agent programs to be executed by the PC 10, data used in various processes performed by the PC 10, and the like. The storage unit 140 may be realized by any of storage devices capable of performing storing magnetically, optically or electrically, such as a hard disk drive (HDD), a solid state drive (SSD), a memory card, an optical disk, a read only memory (ROM) and a random access memory (RAM), for example.

The storage unit 140 includes a device information storage unit 141 storing device information of the PC 10 or device information of a local device. The device information of the PC 10 is stored in advance in the device information storage unit 141, and the device information of a local device is stored therein as appropriate by the control unit 150 described later. The device information of the PC 10 may be any information regarding the PC 10, such as the serial number of the PC 10, the IP address, the MAC address, the device name, the model name, the administrator information, error information and the like, for example. The device information of a local device may be any information regarding the local device, such as the serial number of the local device, the MAC address, the device name, the model name, counter information, error information (call information) and tray information, for example.

The control unit 150 is for controlling each unit of the PC 10, and it may be realized by a control device such as a central processing unit (CPU) or the like. The control unit 150 includes an OS 160 and agent software 170. Here, the control unit 150 realizes the OS 160 and the agent software 170 as software by starting (executing) OS programs and agent programs stored in the storage unit 140.

The OS 160 is for controlling each unit of the PC 10 (more specifically, the hardware and software of the PC 10), and it may be realized by basic software such as Windows (registered trademark) or UNIX (registered trademark), for example. The OS 160 includes a second receiving unit 161, a generating unit 162 and a second transmitting unit 163.

The second receiving unit 161 receives from the device management apparatus 30, via the network 2, a device information acquisition request in a first protocol. In the present embodiment, an explanation is given assuming that the first protocol is Simple Network Management Protocol (SNMP), but the first protocol is not limited thereto. The first protocol may be any protocol that allows the device management apparatus 30 to manage a network device, such as HyperText Transfer Protocol (HTTP) or Simple Object Access Protocol (SOAP), for example. The generating unit 162 and the second transmitting unit 163 will be described later.

The agent software 170 is for acquiring device information from a local device, and includes a protocol determination module 171, and a first protocol conversion module 180 to an n-th (n is a positive integer) protocol conversion module 190.

The protocol determination module 171 includes a determining unit 172 and a setting unit 173.

The determining unit 172 determines whether or not to convert the device information acquisition request in the first protocol received by the second receiving unit 161 into another protocol.

Specifically, the determining unit 172 checks whether or not the PC 10 is connected to a local device, using registry information, port information or the like in the storage unit 140, and when the PC 10 is not connected to the local device, the determining unit 172 determines not to convert the device information acquisition request in the first protocol into another protocol. Also, when the device information that is requested by the device information acquisition request in the first protocol is stored in the device information storage unit 141, or is stored and satisfies a predetermined condition, the determining unit 172 determines not to convert the device information acquisition request in the first protocol into another protocol.

In the present embodiment, the agent software 170 acquires fixed (invariable) device information, such as a serial number, a MAC address, a device name and a model name, from a local device connected to the PC 10 at the time of activation of the local device, and stores the same in the device information storage unit 141. Therefore, when the device information that is requested by the device information acquisition request in the first protocol is fixed device information as described above, since the information is already stored in the device information storage unit 141, the determining unit 172 determines not to convert the device information acquisition request in the first protocol into another protocol.

Also, in the present embodiment, when an error occurs in a local device connected to the PC 10, the agent software 170 receives, from the local device, error information (call information) regarding the error which has occurred and stores the same in the device information storage unit 141. Therefore, when the device information that is requested by the device information acquisition request in the first protocol is the error information, if the information is stored in the device information storage unit 141 and satisfies a predetermined condition, the determining unit 172 determines not to convert the device information acquisition request in the first protocol into another protocol. A predetermined condition here is whether or not the time from the occurrence of an error to the decision by the determining unit 172 exceeds a predetermined period of time, for example, and if it does, the predetermined condition is not satisfied, and if it does not, the predetermined condition is satisfied.

On the other hand, when a local device is connected to the PC 10 and the device information that is requested by the device information acquisition request in the first protocol is not stored in the device information storage unit 141 or is stored but does not satisfy the predetermined condition, the determining unit 172 determines to convert the device information acquisition request in the first protocol into a protocol for the corresponding device.

For example, when the device information that is requested by the device information acquisition request in the first protocol is counter information or tray information, since it is not stored in the device information storage unit 141, the determining unit 172 determines to convert the device information acquisition request in the first protocol into the protocol for the corresponding device. Also, for example, when the device information that is requested by the device information acquisition request in the first protocol is error information, if the information is stored in the device information storage unit 141 but does not satisfy the predetermined condition, the determining unit 172 determines to convert the device information acquisition request in the first protocol into the protocol for the corresponding device.

The setting unit 173 sets the protocol for the corresponding device into which the device information acquisition request in the first protocol received by the second receiving unit 161 is to be converted. Specifically, when the determining unit 172 determines that the device information acquisition request in the first protocol is to be converted into the protocol for the corresponding device, the setting unit 173 sets the protocol for the device corresponding to the device information acquisition request in the first protocol, using the model name or the like of the local device stored in the device information storage unit 141.

In the present embodiment, since the device 20 is connected to the PC 10 via the communication interface 3, the setting unit 173 sets, using the model name or the like of the device 20 stored in the device information storage unit 141, a second protocol as the protocol into which the device information acquisition request in the first protocol is to be converted. Here, an explanation will be given assuming that the second protocol is a predetermined printer job language (PJL), but the second protocol is not limited thereto. The protocol into which the device information acquisition request in the first protocol is to be converted (hereinafter, referred to as the conversion destination protocol), such as the second protocol, may be any protocol that allows the PC 10 to manage the target local device.

The first protocol conversion module 180 to the n-th protocol conversion module 190 are modules corresponding to the conversion destination protocols of the device information acquisition request in the first protocol, and in the present embodiment, it is assumed that the first protocol conversion module 180 corresponds to the second protocol. Accordingly, the first protocol conversion module 180, among the first protocol conversion module 180 to the n-th protocol conversion module 190, will be mainly described. Additionally, although the conversion destination protocols of protocol conversion modules other than the first protocol conversion module 180 are different from that of the first protocol conversion module 180, the details of the processing are the same.

The first protocol conversion module 180 includes a request generating unit 181, a first transmitting unit 182, a first receiving unit 183 and a response generating unit 184.

The request generating unit 181 generates first device information acquisition request in the second protocol based on the device information acquisition request in the first protocol which has been transmitted from the device management apparatus 30 over the network 2. Specifically, the request generating unit 181 generates the first device information acquisition request in the second protocol set by the setting unit 173, based on the device information acquisition request in the first protocol received by the second receiving unit 161. The first device information acquisition request in the second protocol is for requesting for acquisition of counter information of a local device, for example.

Also, the request generating unit 181 generates a second device information acquisition request in the second protocol at the time of activation of a local device connected to the PC 10. The second device information acquisition request in the second protocol is for requesting for acquisition of fixed device information of the local device, for example.

The first transmitting unit 182 transmits, to the local device, via the communication interface 3, the first device information acquisition request in the second protocol and the second device information acquisition request in the second protocol generated by the request generating unit 181.

The first receiving unit 183 receives, from the local device, via the communication interface 3, a first device information acquisition response in the second protocol and a second device information acquisition response in the second protocol including the device information of the local device. Additionally, the first device information acquisition response in the second protocol is a response to the first device information acquisition request in the second protocol, and the second device information acquisition response in the second protocol is a response to the second device information acquisition request in the second protocol.

Also, the first receiving unit 183 receives, from the local device, via the communication interface 3, a device information notification in the second protocol including the device information of the device. The device information notification in the second protocol notifies of error information of the local device and includes the error information as the device information of the local device, for example.

The response generating unit 184 converts the pieces of device information of the local device included in the second device information acquisition response in the second protocol and the device information notification in the second protocol received by the first receiving unit 183 into those in the first protocol, and stores the same in the device information storage unit 141.

Also, when the determining unit 172 determines that the device information acquisition request in the first protocol is not to be converted into another protocol, the response generating unit 184 generates a device information acquisition response in the first protocol using the device information of the local device stored in the device information storage unit 141.

Also, the response generating unit 184 generates the device information acquisition response in the first protocol based on the first device information acquisition response in the second protocol received by the first receiving unit 183. At this time, the response generating unit 184 may generate the device information acquisition response in the first protocol using not only the device information included in the first device information acquisition response in the second protocol, but also the device information of the PC 10 or the local device stored in the device information storage unit 141.

Here, the processing of the first protocol conversion module 180 and the n-th protocol conversion module 190 will be described taking acquisition of the tray information of a local device as an example. As described above, the first protocol conversion module 180 is a module corresponding to a predetermined PJL (the second protocol), and the n-th protocol conversion module 190 is a module corresponding to a PJL different from the predetermined PJL. Additionally, it is assumed here that a local device other than the device 20 is connected to the PC 10.

When the conversion destination protocol of the device information acquisition request in the first protocol is set by the setting unit 173 to be the predetermined PJL, the first protocol conversion module 180 generates, as the first device information acquisition request in the predetermined PJL, @PJL INQUIRE INTRAYXSIZE, PJL INQUIRE INTRAYXQUANT and @PJL INQUIRE INTRAYXMEDIA, transmits the same to the device 20, receives a response from the device 20, formats the received response into XML data as illustrated in FIG. 3, parses the data in a tag "<variables>" in the formatted XML data, and converts the same for the first protocol.

When the conversion destination protocol of the device information acquisition request in the first protocol is set by the setting unit 173 to be the PJL different from the predetermined PJL, the n-th protocol conversion module 190 generates @PJL INFO STATUS as the first device information acquisition request in the PJL, transmits the same to a local device which is not the device 20 connected to the PC 10, receives a response from the local device, formats the received response into XML data as illustrated in FIGS. 4A and 4B, parses the data in a tag "<statuses>" in the formatted XML data, and converts the same for the first protocol.

The generating unit 162 and the second transmitting unit 163 will now be described.

The generating unit 162 generates a device information acquisition response in the first protocol for the device information acquisition request in the first protocol received by the second receiving unit 161, using the device information of the PC 10 stored in the device information storage unit 141.

The second transmitting unit 163 transmits, to the device management apparatus 30, over the network 2, the device information acquisition response in the first protocol, generated by the response generating unit 184, including the device information of the local device and the device information acquisition response in the first protocol, generated by the generating unit 162, including the device information of the PC 10.

Additionally, the PC 10 does not have to include all of the units described above, and one or some of the units may be omitted.

Figure 5:
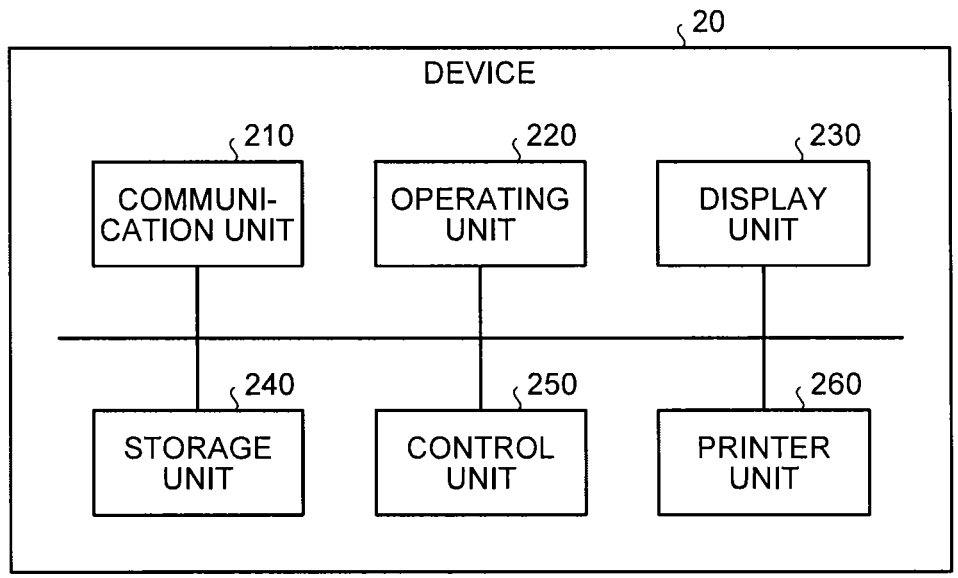
FIG. 5 is a block diagram illustrating an example of a configuration of a device according to the present embodiment.

FIG. 5 is a block diagram illustrating an example of a configuration of the device 20 according to the present embodiment. As illustrated in FIG. 5, the device 20 includes a communication unit 210, an operating unit 220, a display unit 230, a storage unit 240, a control unit 250 and a printer unit 260.

The communication unit 210 is for communicating with the PC 10 via the communication interface 3, and it may be realized by a USB or the like.

The operating unit 220 is for inputting various operations, and it may be realized by an input device such as a keyboard, a mouse, a touch pad, a touch panel or the like.

The display unit 230 is for displaying various screens, and it may be realized by a display device such as a liquid-crystal display, a touch panel display or the like.

The storage unit 240 stores various programs to be executed by the device 20, data used in various processes performed by the device 20, such as the device information of the device 20, and the like. The storage unit 240 may be realized by any of storage devices capable of performing storing magnetically, optically or electrically, such as an HDD, an SSD, a memory card, an optical disk, a ROM and a RAM, for example.

The control unit 250 is for controlling each unit of the device 20, and it may be realized by a control device such as a CPU or the like. Upon receiving the first device information acquisition request in the second protocol or the second device information acquisition request in the second protocol from the PC 10 via the communication interface 3, the control unit 250 generates the first device information acquisition response in the second protocol or the second device information acquisition response in the second protocol and transmits the same to the PC 10 via the communication interface 3. Also, when an error occurs in the device 20, the control unit 250 generates the device information notification in the second protocol and transmits the same to the PC 10 via the communication interface 3.

The printer unit 260 performs printing when printing is requested by the PC 10 using PJL.

Figure 6:
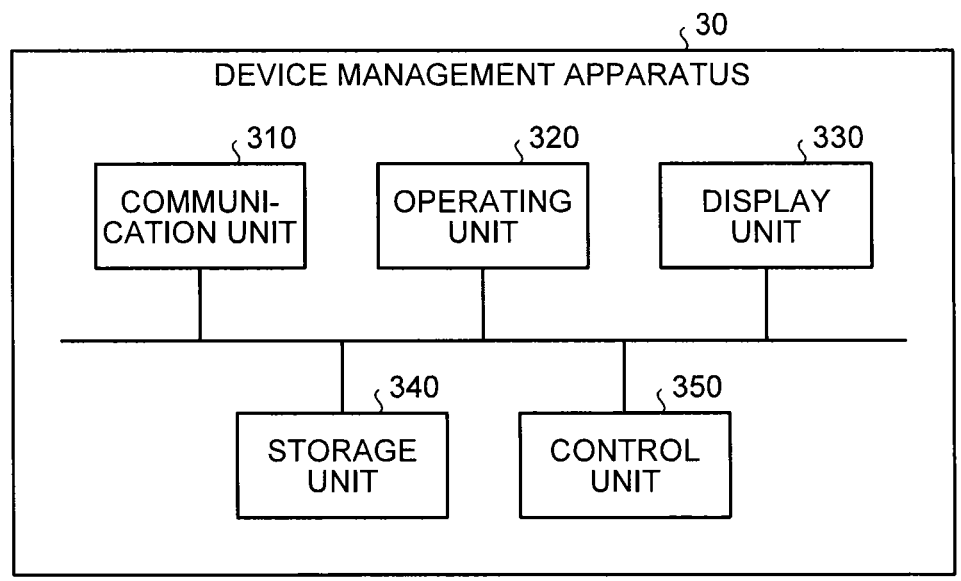
FIG. 6 is a block diagram illustrating an example of a configuration of a device management apparatus according to the present embodiment.

FIG. 6 is a block diagram illustrating an example of a configuration of the device management apparatus 30 according to the present embodiment. As illustrated in FIG. 6, the device management apparatus 30 includes a communication unit 310, an operating unit 320, a display unit 330, a storage unit 340 and a control unit 350.

The communication unit 310 is for communicating with a network device such as the PC 10 or the device 21 or 22 over the network 2, and it may be realized by a NIC or the like.

The operating unit 320 is for inputting various operations, and it may be realized by an input device such as a keyboard, a mouse, a touch pad, a touch panel or the like.

The display unit 330 is for displaying various screens, and it may be realized by a display device such as a liquid-crystal display, a touch panel display or the like.

The storage unit 340 stores various programs such as device management programs to be executed by the device management apparatus 30, data used in various processes performed by the device management apparatus 30, and the like. The storage unit 340 may be realized by any of storage devices capable of performing storing magnetically, optically or electrically, such as an HDD, an SSD, a memory card, an optical disk, a ROM and a RAM, for example.

The control unit 350 is for controlling each unit of the device management apparatus 30, and it may be realized by a control device such as a CPU or the like. The control unit 350 functions as a manager of the agent software 170 of the PC 10 by activating (executing) the device management program stored in the storage unit 340.

The control unit 350 transmits the device information acquisition request in the first protocol to a network device over the network 2, and receives the device information acquisition response in the first protocol from the network device over the network 2. Then, the control unit 350 stores, in the storage unit 340, the device information included in the device information acquisition response in the first protocol, and manages the network device.

Furthermore, when a local device is connected to a network device as the PC 10, the control unit 350 receives the device information not only of the network device, but also of the local device by the device information acquisition response in the first protocol. Accordingly, the control unit 350 manages not only the network device, but also the local device.

Next, an operation of the device management system including the information processing apparatus according to the present embodiment will be described.

Figure 7:
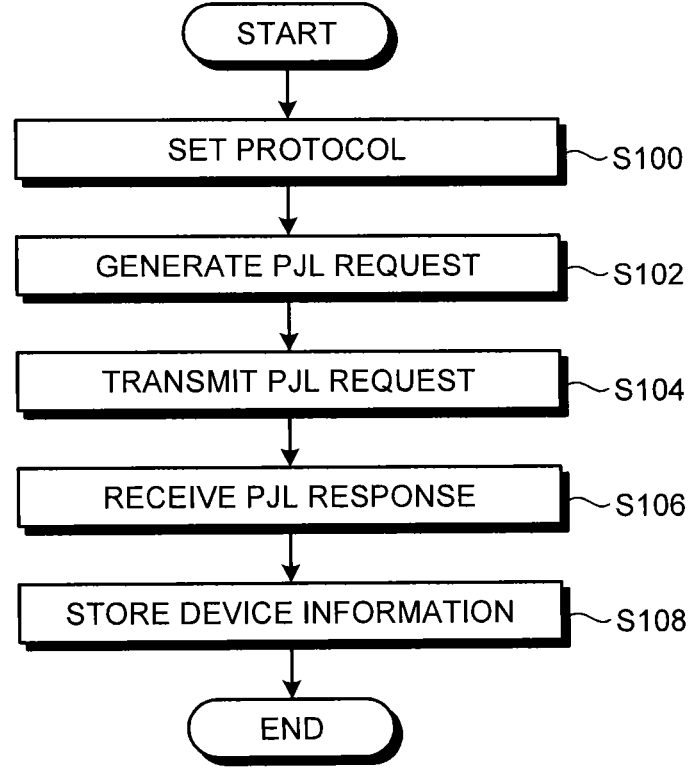
FIG. 7 is a flow chart illustrating an example of a process that is performed at the device management system according to the present embodiment at the time of activation of a device.

FIG. 7 is a flow chart illustrating an example of a process that is performed at the device management system 1 according to the present embodiment at the time of activation of the device 20.

First, when the device 20 that is connected to the PC 10 via the communication interface 3 is activated, the setting unit 173 sets a protocol to be used in the communication with the device 20 (step S100). Here, it is assumed that the setting unit 173 sets PJL as the protocol to be used in the communication with the device 20.

Next, the request generating unit 181 generates a second device information acquisition request which is a request in the PJL determined by the setting unit 173 and which is for requesting for acquisition of fixed device information of the device 20 (step S102).

Subsequently, the first transmitting unit 182 transmits the PJL request generated by the request generating unit 181 to the device 20 via the communication interface 3 (step S104).

Then, the first receiving unit 183 receives, from the device 20, via the communication interface 3, a second device information acquisition response which is a PJL response generated by the device 20 and which is a respond to the acquisition request of the fixed device information of the device 20 (step S106).

Subsequently, the response generating unit 184 converts the fixed device information of the device 20 included in the PJL response received by the first receiving unit 183 for the first protocol and stores the same in the device information storage unit 141 (step S108).

Figure 8:
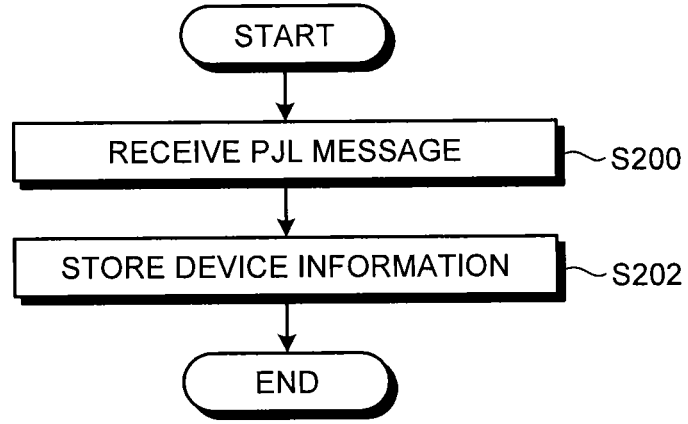
FIG. 8 is a flow chart illustrating an example of a process that is performed at the device management system according to the present embodiment at the time of occurrence of an error in a device.

FIG. 8 is a flow chart illustrating an example of a process that is performed at the device management system 1 according to the present embodiment at the time of occurrence of an error in the device 20.

First, when an error occurs in the device 20, the first receiving unit 183 receives, from the device 20, via the communication interface 3, a device information notification which is a PJL message and which notifies of error information of the device 20 (step S200).

Then, the response generating unit 184 converts the error information of the device 20 included in the PJL message received by the first receiving unit 183 for the first protocol and stores the same in the device information storage unit 141 (step S202).

Figure 9:
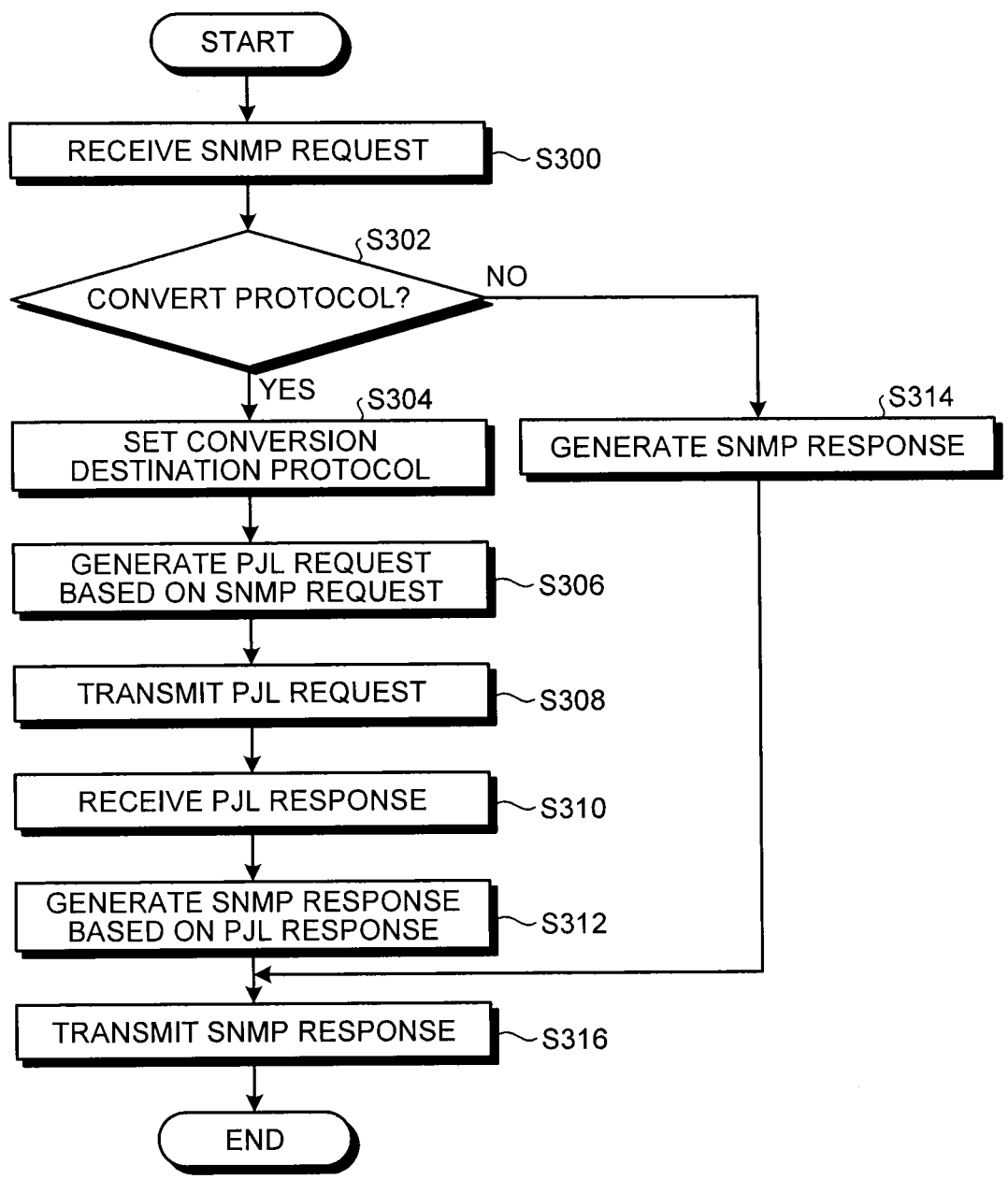
FIG. 9 is a flow chart illustrating an example of a process that is performed at the device management system according to the present embodiment when device information is requested by the device management apparatus.

FIG. 9 is a flow chart illustrating an example of a process that is performed at the device management system 1 according to the present embodiment when the device information is requested by the device management apparatus 30.

First, the second receiving unit 161 receives a device information acquisition request which is an SNMP request from the device management apparatus 30 over the network 2 (step S300).

Next, the determining unit 172 determines whether or not to convert the SNMP request received by the second receiving unit 161 into the protocol for the corresponding device (step S302).

In the case of converting the protocol of the SNMP request (YES in step S302), the setting unit 173 sets a conversion destination protocol of the SNMP request using the model name or the like of the local device stored in the device information storage unit 141 (step S304). Here, it is assumed that the PJL is set by the setting unit 173 as the protocol to be used in the communication with the device 20.

Then, based on the SNMP request, the request generating unit 181 generates a first device information acquisition request which is a request in the PJL set by the setting unit 173 and which is for requesting for acquisition of device information such as the counter information or the like of the device 20 (step S306).

Next, the first transmitting unit 182 transmits the PJL request generated by the request generating unit 181 to the device 20 via the communication interface 3 (step S308).

Subsequently, the first receiving unit 183 receives, from the device 20, via the communication interface 3, a second device information acquisition response which is a PJL response generated by the device 20 and which is a respond to the acquisition request of the device information such as the counter information or the like of the device 20 (step S310).

Then, based on the PJL response, the response generating unit 184 generates a device information acquisition response which is an SNMP response and which includes the device information of the device 20 (step S312).

On the other hand, in the case of not converting the protocol of the SNMP request (NO in step S302), the response generating unit 184 generates a device information acquisition response which is an SNMP response and which includes the device information of the device 20, using the device information of the local device stored in the device information storage unit 141 (step S314).

Then, the generating unit 162 generates a device information acquisition response which is a response to the SNMP request and which includes the device information of the PC 10, using the device information of the PC 10 stored in the device information storage unit 141. Then, the second transmitting unit 163 transmits, to the device management apparatus 30, over the network 2, the SNMP response generated by the response generating unit 184 and the SNMP response generated by the generating unit 162 (step S316).

As described above, according to the present embodiment, when a device information acquisition request in the first protocol is received from the device management apparatus 30, the PC 10 generates a device information acquisition request in the second protocol used in the communication with a local device based on the device information acquisition request in the first protocol, acquires device information from the local device, and notifies the device management apparatus 30 of the acquired device information by a device information acquisition response in the first protocol. Thus, according to the present embodiment, the same device information as that of a network device can be acquired with respect to a local device which is not connected to the network, and the device management apparatus is enabled to perform high-level management also with respect to the local device.

Additionally, with a conventional device management system, due to the difference in the protocols and the like, sufficient device information is not acquired with respect to a local device in the case of managing the local device, and only the live state or the like is managed.

Moreover, according to the present embodiment, since the fixed device information of a local device is acquired from the local device in advance and does not have to be acquired from the local device every time, the amount of communication between the PC 10 and the local device can be reduced and the processing performance can be increased.

Hardware Configuration

Figure 10:
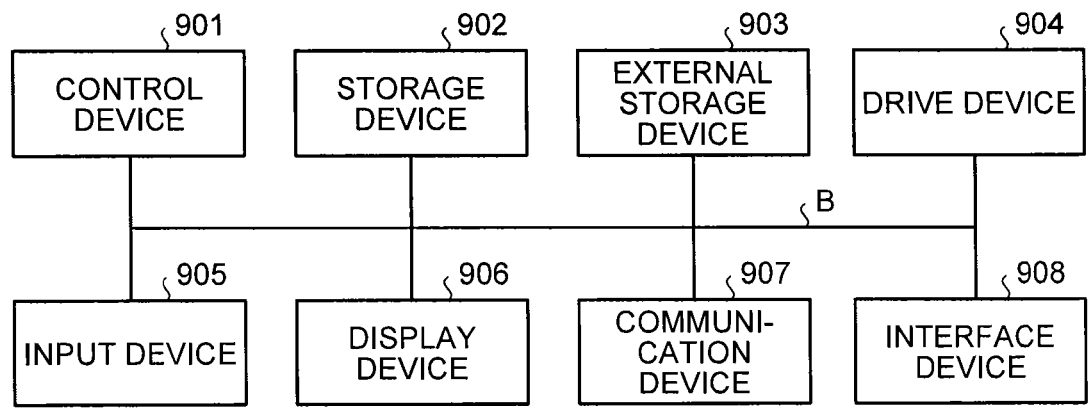
FIG. 10 is a block diagram illustrating an example of a hardware configuration of a PC 10 and a device management apparatus 30 according to the present embodiment.

FIG. 10 is a block diagram illustrating an example of a hardware configuration of the PC 10 and the device management apparatus 30 according to the present embodiment. As illustrated in FIG. 10, the PC 10 and the device management apparatus 30 of the present embodiment each include a control device 901 such as a CPU, a storage device 902 such as a ROM or a RAM, an external storage device 903 such as an HDD or an SSD, a drive device 904, an input device 905 such as a mouse or a keyboard, a display device 906 such as a display, a communication device 907 such as a NIC, and an interface device 908, the devices being interconnected by a bus B, and may be realized by a hardware configuration using a regular computer.

The agent program to be executed by the PC 10 of the present embodiment and the device management program to be executed by the device management apparatus 30 of the present embodiment are provided being stored, in a format that can be installed or executed, in a computer-readable storage medium, such as a CD-ROM, a CD-R, a memory card, a digital versatile disk (DVD), a flexible disk (FD) or the like.

Moreover, the agent program to be executed by the PC 10 of the present embodiment and the device management program to be executed by the device management apparatus 30 of the present embodiment may be stored in a computer connected to a network such as the Internet and be provided by being downloaded via the network. Furthermore, the agent program to be executed by the PC 10 of the present embodiment and the device management program to be executed by the device management apparatus 30 of the present embodiment may be provided or distributed via a network such as the Internet. Still further, the agent program to be executed by the PC 10 of the present embodiment and the device management program to be executed by the device management apparatus 30 of the present embodiment may be provided being embedded in a ROM or the like in advance.

The agent program to be executed by the PC 10 of the present embodiment and the device management program to be executed by the device management apparatus 30 of the present embodiment are modules for realizing each unit described above in the computer. With respect to the actual hardware, each unit is realized on the computer by the control device 901 reading a program from the external storage device 903 using the storage device 902 and executing the program.

Modification

The information processing apparatus according to the present invention is not limited to the embodiment described above, and various modifications are allowed. For example, in the embodiment described above, an explanation has been given assuming a case where the local device such as the device 20 is a printer, but the local device may also be a projector or the like, for example.

Figure 11:
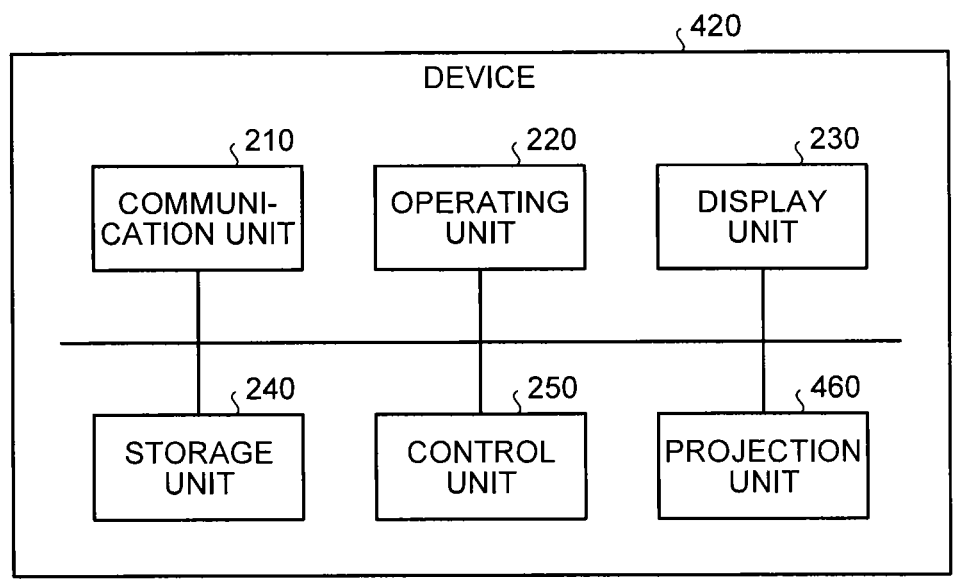
FIG. 11 is a block diagram illustrating an example of a configuration of a device according to a modification.

FIG. 11 is a block diagram illustrating an example of a configuration of a device 420 according to a modification. As illustrated in FIG. 11, the device 420 includes the communication unit 210, the operating unit 220, the display unit 230, the storage unit 240, the control unit 250 and a projection unit 460.

The communication unit 210, the operating unit 220, the display unit 230, the storage unit 240 and the control unit 250 are the same as those of the embodiment described above. The projection unit 460 performs projection when projection is requested by the PC 10 in PJL.

In this manner, in the case the device 420 is a projector, when the conversion destination protocol of a device information acquisition request in the first protocol is set by the setting unit 173 to be a predetermined PJL, the first protocol conversion module 180 of the PC 10 generates @PJL INQUIRE INTRAYXSIZE, PJL INQUIRE INTRAYXQUANT and @PJL INQUIRE INTRAYXMEDIA as the first device information acquisition request in the predetermined PJL, transmits the same to the device 420, receives a response from the device 420, formats the received response into XML data as illustrated in FIG. 12, parses the data in a tag "<variables>" in the formatted XML data, and converts the same for the first protocol.

Likewise, when the conversion destination protocol of a device information acquisition request in the first protocol is determined by the setting unit 173 to be the PJL different from the predetermined PJL, the n-th protocol conversion module 190 of the PC 10 generates @PJL INFO STATUS as the first device information acquisition request in the PJL, transmits the same to a local device which is different from the device 420 and which is connected to the PC 10, receives a response from the local device, formats the received response into XML data as illustrated in FIG. 13, parses the data in a tag "<statuses>" in the formatted XML data, and converts the same for the first protocol.

According to the embodiments, an effect is achieved that a device management apparatus is enabled to perform high-level management even when managing a device via an information processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus communicable with a device via a local interface and communicable with a device management apparatus for managing the device via a network interface, the information processing apparatus comprising:
   circuitry configured to
      determine whether to perform conversion of a first protocol in response to receiving a device information acquisition request in the first protocol from the device management apparatus via the network interface,
      set a second protocol into which the device information acquisition request in the first protocol is to be converted when the circuitry determines to perform the conversion of the first protocol,
      convert the first protocol for the device information acquisition request into the second protocol set by the circuitry,
      generate a first device information acquisition request in the second protocol,
      transmit the first device information acquisition request in the second protocol to the device via the local interface,
      receive a first device information acquisition response in the second protocol including device information of the device from the device via the local interface, the first device information acquisition response being transmitted by the device in response to the first device information acquisition request, and
      convert the received first device information acquisition response in the second protocol into a response in the first protocol.

2. The information processing apparatus according to claim 1, further comprising a device information storage configured to store the device information, wherein
   when the device information that is requested by the device information acquisition request in the first protocol is not stored in the device information storage or is stored but does not satisfy a predetermined condition, the circuitry determines to convert the device information acquisition request in the first protocol into the second protocol, and
   the circuitry generates the first device information acquisition request in the second protocol set by the circuitry, based on the device information acquisition request in the first protocol.

3. The information processing apparatus according to claim 2, wherein
   the circuitry generates a second device information acquisition request in the second protocol at a time of activation of the device,
   the circuitry transmits the second device information acquisition request in the second protocol to the device via the local interface,
   the circuitry receives a second device information acquisition response in the second protocol including the device information from the device via the local interface, and
   the device information storage stores the device information included in the second device information acquisition response in the second protocol.

4. The information processing apparatus according to claim 2, wherein
   the circuitry receives a device information notification in the second protocol including the device information from the device via the local interface, and
   the device information storage stores the device information included in the device information notification in the second protocol.

5. The information processing apparatus according to claim 1, further comprising a device information storage configured to store the device information, wherein
   when the device information that is requested by the device information acquisition request in the first protocol is stored in the device information storage or is stored and satisfies a predetermined condition, the circuitry determines not to convert the device information acquisition request in the first protocol into the second protocol, and
   when the device information acquisition request in the first protocol is determined not to be converted into the second protocol, the circuitry generates the device information acquisition response in the first protocol by using the device information stored in the device information storage.

6. The information processing apparatus according to claim 5, wherein
   the circuitry generates a second device information acquisition request in the second protocol at a time of activation of the device,
   the circuitry transmits the second device information acquisition request in the second protocol to the device via the local interface,
   the circuitry receives a second device information acquisition response in the second protocol including the device information from the device via the local interface, and
   the device information storage stores the device information included in the second device information acquisition response in the second protocol.

7. The information processing apparatus according to claim 5, wherein
   the circuitry receives a device information notification in the second protocol including the device information from the device via the local interface, and
   the device information storage stores the device information included in the device information notification in the second protocol.

8. The information processing apparatus according to claim 1, wherein the circuitry is further configured to
   transmit the device information acquisition response in the first protocol to the device management apparatus via the network interface.

9. A non-transitory computer-readable storage medium with an executable program stored thereon, wherein the program instructs a computer that is communicable with a device via a local interface and communicable with a device management apparatus for managing the device via a network interface, to perform:

determining whether to perform conversion of a first protocol in response to receiving a device information acquisition request in the first protocol from the device management apparatus via the network interface;

setting a second protocol into which the device information acquisition request in the first protocol is to be converted when determining to perform the conversion of the first protocol;

converting the first protocol for the device information acquisition request into the second protocol set by the setting;

generating a first device information acquisition request in the second protocol;

transmitting the first device information acquisition request in the second protocol to the device via the local interface;

receiving a first device information acquisition response in the second protocol including device information of the device from the device via the local interface, the first device information acquisition response being transmitted by the device in response to the first device information acquisition request; and converting the received first device information acquisition response in the second protocol into a response in the first protocol.

10. A method for an apparatus communicable with a device via a local interface and communicable with a device management apparatus for managing the device via a network interface, the method comprising:

determining whether to perform conversion of a first protocol in response to receiving a device information acquisition request in the first protocol from the device management apparatus via the network interface;

setting a second protocol into which the device information acquisition request in the first protocol is to be converted when determining to perform the conversion of the first protocol;

converting the first protocol for the device information acquisition request into the second protocol set by the setting;

generating a first device information acquisition request in the second protocol;

transmitting the first device information acquisition request in the second protocol to the device via the local interface;

receiving a first device information acquisition response in the second protocol including device information of the device from the device via the local interface, the first device information acquisition response being transmitted by the device in response to the first device information acquisition request; and converting the received first device information acquisition response in the second protocol into a response in the first protocol.

11. The information processing apparatus according to claim 1, wherein the first protocol corresponds to a simple network management protocol (SNMP), and the second protocol corresponds to a printer job language (PJL).

* * * * *